United States Patent

Kim

[11] Patent Number: 5,912,707
[45] Date of Patent: Jun. 15, 1999

[54] METHOD AND APPARATUS FOR COMPENSATING ERRORS IN A TRANSMITTED VIDEO SIGNAL

[75] Inventor: Jin-Hun Kim, Seoul, Rep. of Korea

[73] Assignee: Daewoo Electronics., Ltd., Seoul, Rep. of Korea

[21] Appl. No.: 08/780,089

[22] Filed: Dec. 23, 1996

[30] Foreign Application Priority Data

Dec. 23, 1995 [KR] Rep. of Korea .................. 1995/55653

[51] Int. Cl.$^6$ .............................. H04N 7/12; H04N 5/14
[52] U.S. Cl. ...................... 348/415; 348/699; 348/845.1
[58] Field of Search .................... 348/415, 416, 348/699, 845.1, 400, 405, 408, 414, 422

[56] References Cited

U.S. PATENT DOCUMENTS

| | | | |
|---|---|---|---|
| 5,243,428 | 9/1993 | Challapali | 348/416 |
| 5,247,363 | 9/1993 | Sun et al. | |
| 5,278,647 | 1/1994 | Hingorani et al. | 358/136 |
| 5,420,872 | 5/1995 | Hyodo et al. | 348/616 |
| 5,442,400 | 8/1995 | Sun et al. | 348/402 |
| 5,455,629 | 10/1995 | Sun et al. | 348/466 |
| 5,541,667 | 7/1996 | Saito | 348/616 |
| 5,621,467 | 4/1997 | Chien et al. | 348/409 |
| 5,737,022 | 4/1998 | Yamaguchi et al. | 348/416 |

FOREIGN PATENT DOCUMENTS 2277655  11/1994  United Kingdom .
9503674   2/1995  WIPO .

*Primary Examiner*—Tommy P. Chin
*Assistant Examiner*—Tung Vo
*Attorney, Agent, or Firm*—Anderson, Kill & Olick, P.C.

[57] ABSTRACT

An error concealment method first detects a lost block in a reconstructed current frame and then extracts pixel values and motion vectors corresponding to neighboring blocks of the lost block. Thereafter, a motion variance of the motion vectors corresponding to the neighboring blocks of the lost block is determined and compared with predetermined threshold values. Subsequently, according to the result of the above comparison process, the method produces a block substituting the lost block based on the motion vectors of the neighboring blocks or pixel values of the neighboring blocks.

24 Claims, 6 Drawing Sheets

FIG. 4

| BLOCK 1 | BLOCK 2 | BLOCK 3 |
|---------|---------|---------|
| BLOCK 4 | BLOCK 0 | BLOCK 5 |
| BLOCK 6 | BLOCK 7 | BLOCK 8 |

METHOD AND APPARATUS FOR COMPENSATING ERRORS IN A TRANSMITTED VIDEO SIGNAL

FIELD OF THE INVENTION

The present invention relates to a method and apparatus for use in a video signal decoding system having an error concealment; and, more particularly, to a method and apparatus for concealing errors present in a decoded video signal transmitted in a compressed form.

DESCRIPTION OF THE PRIOR ART

As is well known, transmission of digitized video signals can attain video images of a much higher quality than the transmission of analog signals. When a video signal is expressed in a digital form, a substantial amount of data is generated for transmission, especially in the case of a high definition television(HDTV) system. Since, however, the available frequency bandwidth of a conventional transmission channel is limited, in order to transmit the substantial amount of digital data therethrough, it is inevitable to compress or reduce the volume of the transmission data.

In conventional transmission systems, the video signal is compressed on a block-by-block basis by using, e.g., DCT (Discrete Cosine Transform) and motion compensation techniques; and the compressed video signal is transmitted to a receiving end through a noisy transmission channel, entailing data losses or damages in the transmitted video signal. Such transmission systems, however, do not provide sufficient overhead mechanism to restore all errors, but rather depend on error concealment at the receiving end in order to supply substitution data for approximating the unrestored data.

One of the conventional error concealment scheme is disclosed in U.S. Pat. No. 5,541,667, issued Jul. 30, 1996 and entitled "METHOD AND APPARATUS FOR LOST BLOCK SUBSTITUTION IN A MOVING PICTURE RECEIVING SYSTEM". In this patent, the method for receiving a moving picture on a block-by-block basis includes the steps of detecting a lost block which cannot be reproduced in the received video signal, calculating an average value of blocks adjacent to the lost block, adaptively substituting the lost block with the average value or a block at a same location in a preceding frame. And, the apparatus accomplishing the proposed method includes a lost block detection block, a block average value calculation block, a substitution control block, an adjacent block average value calculation block and a selector.

Since, however, the above error concealment method and apparatus do not consider the motion of the moving picture, although the errors occurred in the received video signal are compensated to a certain degree, it still remains desirable to develop a method and apparatus capable of taking into consideration the motion of the moving picture for further improving the error concealment of the lost or damaged block in the received video signal.

SUMMARY OF THE INVENTION

It is, therefore, a primary object of the invention to provide an error concealment method and apparatus capable of improving the quality of an error concealed block in a transmitted video signal by using motion vectors for the transmitted video signal.

In accordance with one aspect of the present invention, there is provided a method, for use in a video signal decoding system, for concealing errors in a video signal transmitted in a compressed form, wherein the video signal includes a reconstructed current frame restored based on motion vectors for a current frame and a reconstructed preceding frame, each of the frames being divided into a multiplicity of blocks each of which has N×M pixel values with N and M being positive integers, the method comprising the steps of: detecting a lost block containing errors; providing pixel values of neighboring blocks of the lost block in the reconstructed current frame and motion vectors corresponding thereto; generating a compensation block based on the motion vectors for the neighboring blocks; and providing the compensation block as a substitution block for concealing the lost block.

In accordance with another aspect of the present invention, there is supplied an apparatus, for use in a video signal decoding system, for concealing errors in a video signal transmitted in a compressed form, wherein the video signal includes a reconstructed current frame restored based on motion vectors for a current frame and a reconstructed preceding frame, each of the frames being divided into a multiplicity of blocks each of which has N×M pixel values with N and M being positive integers, which comprises: a lost block detector for checking a lost block containing errors to thereby produce position data representing the position of the lost block in the reconstructed current frame; a neighboring block determination circuit for providing pixel values of neighboring blocks of the lost block in the reconstructed current frame and motion vectors corresponding thereto based on the position data; a mean vector calculator for computing a mean vector by using the motion vectors for the neighboring blocks; and a block generator for producing a motion-based block using the mean vector or the position data and pixel values of the reconstructed preceding frame and providing the motion-based block as a substitution block for correcting the lost block.

BRIEF DESCRIPTION OF THE DRAWINGS

The above and other objects and features of the present invention will become apparent from the following description of preferred embodiments given in conjunction with the accompanying drawings, in which:

FIG. 4 offers a schematic representation of a lost block and its neighboring blocks in a reconstructed current frame;

DETAILED DESCRIPTION OF THE PREFERRED EMBODIMENTS

Figure 1:
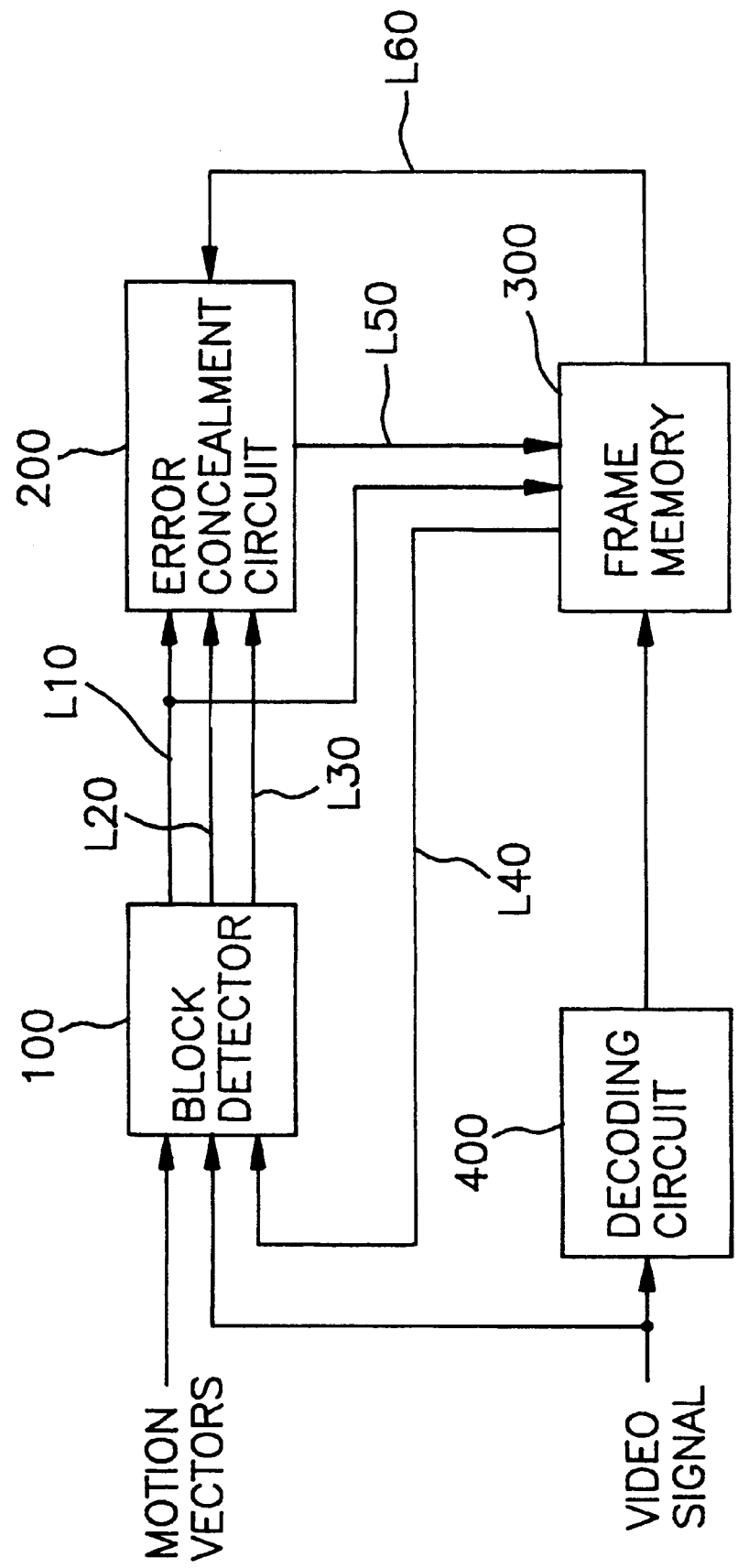
FIG. 1 shows a schematic block diagram of an error concealment system.

Referring to FIG. 1, a video signal transmitted in a compressed form is decoded at a decoding circuit 400 through the use of conventional decoding techniques such as a variable length decoding, an inverse quantization and an inverse DCT and provided to a frame memory 300 as a decoded video signal which includes a reconstructed current frame and a reconstructed preceding frame, each of the frames including a being divided into a multiplicity of blocks, e.g., a block of N×M pixels with N and M being positive integers. And, the decoded video signal is stored at a frame memory 300.

The video signal is also fed to a block detector 100 and the block detector 100 checks a lost block in the video signal to thereby provide position data representing the position of the lost block onto a line L10, the lost block containing errors; and provides block information of neighboring blocks for the lost block based on motion vectors corresponding to the video signal and the reconstructed current frame retrieved from the frame memory 300 through a line L40, the block information including motion vectors of the neighboring blocks and pixel values for each of the neighboring blocks. In the above, the neighboring blocks is determined by the position data coupled to the frame memory 300 via the line L10. The pixel values and motion vectors included in the block information are fed to an error concealment circuit 200 through lines L20 and L30, respectively.

The error concealment circuit 200 generates a substitution block in order to compensate the lost block within the reconstructed current frame, the substitution block being constructed based on the position data on the line L10, the block information on the lines L20 and L30 and the reconstructed preceding frame retrieved from the frame memory 300 via a line L60.

Figure 2:
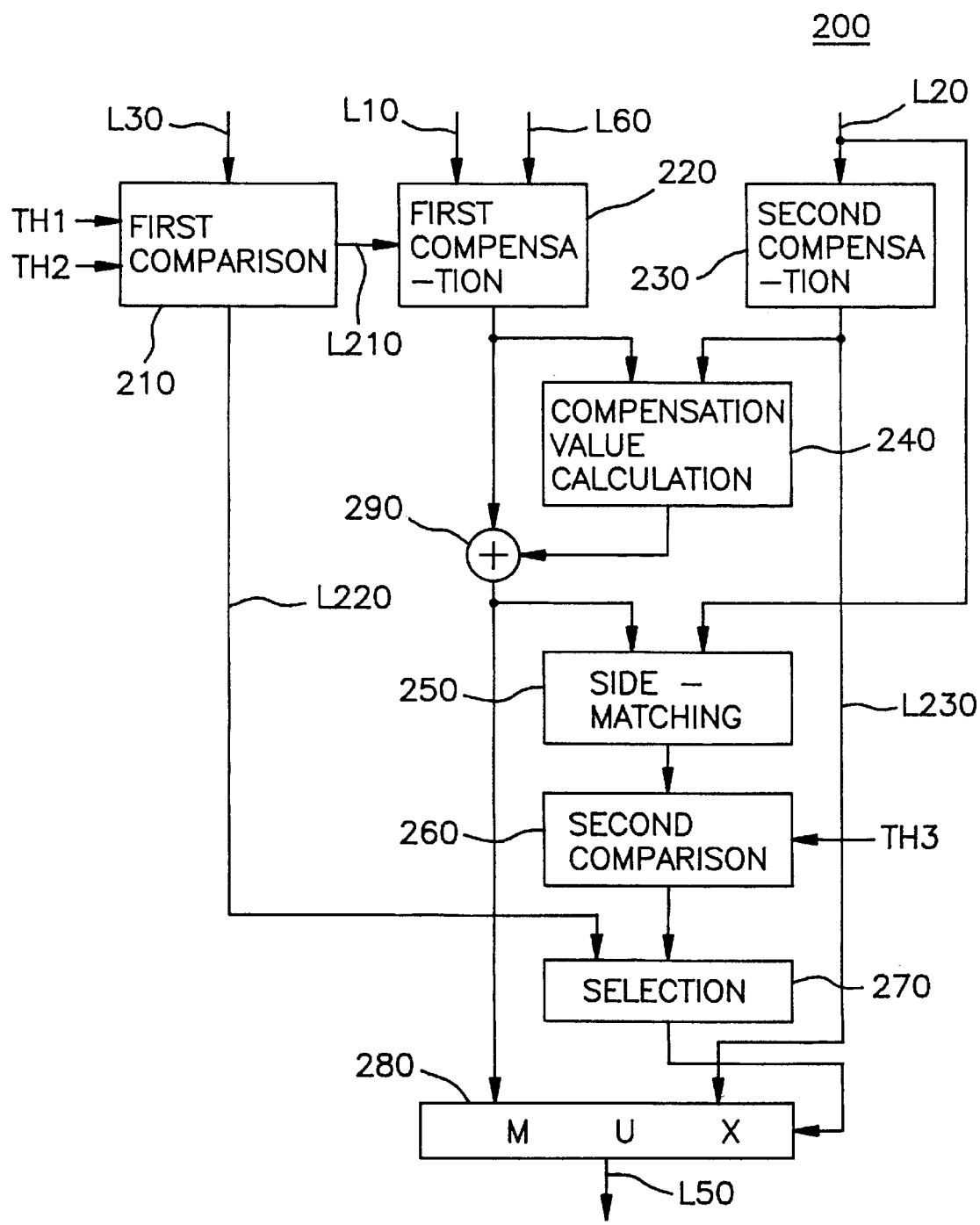
FIG. 2 represents an error concealment circuit 300 in FIG. 1 in accordance with the present invention.

In FIG. 2, there is represented a detailed block diagram of the error concealment circuit 200 shown in FIG. 1. And, a first comparison unit 210 in FIG. 2 is described in FIG. 3 in more detail. The structure of the error concealment circuit 200 and its operation will be understood with reference to FIGS. 2 and 3.

Figure 3:
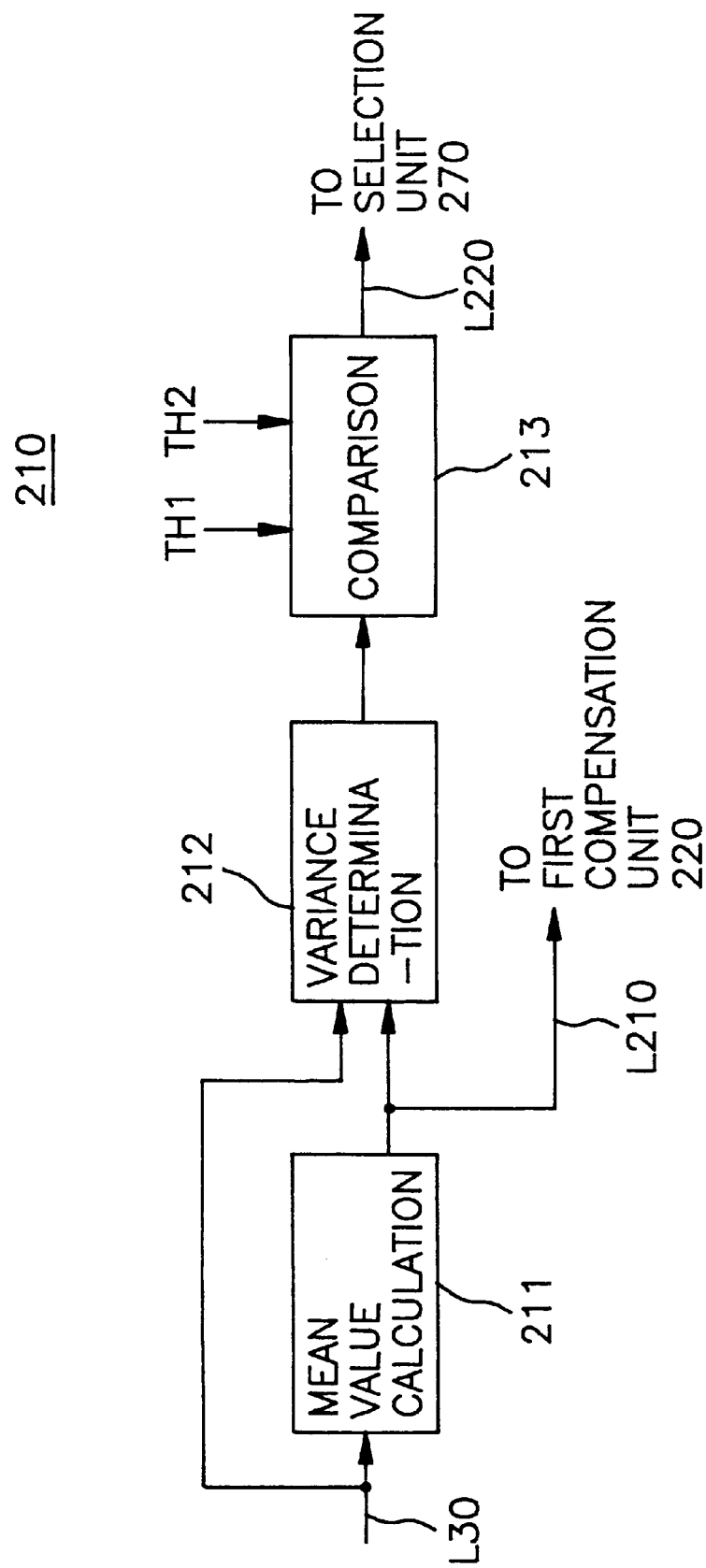
FIG. 3 depicts a detailed block diagram of a first comparison unit 210 shown in FIG. 2.

First of all, referring to FIG. 3, the first comparison unit 210 includes a mean value calculation sector 211, a variance determination sector 212 and a comparison sector 213.

The mean value calculation sector 211 first computes a mean value of the motion vectors of the neighboring blocks of the lost block on the line L30 and provides it to the variance determination sector 212 and a first compensation unit 220 in FIG. 2 through a line L210, wherein the neighboring blocks of the lost block represent, as shown in FIG. 4, 8 number of blocks, i.e., a block 1 to a block 8 surrounding a block 0 when the block 0 is assumed as the lost block.

The variance determination sector 212 calculates, in accordance with the preferred embodiment of the present invention, a motion variance between the mean value from the mean value calculation sector 211 and the motion vectors of the neighboring blocks as follows:

$$\sigma_D^2 = \frac{1}{8}\sum_{k=1}^{8} (D_{MVk} - \overline{D_{MV}})^2 \qquad \text{EQ. 1}$$

$$\sigma_\theta^2 = \frac{1}{8}\sum_{k=1}^{8} (\theta_{MVk} - \overline{\theta_{MV}})^2 \qquad \text{EQ. 2}$$

$$\sigma_T^2 = \sigma_D^2 + \sigma_\theta^2 \qquad \text{EQ. 3}$$

wherein $\sigma_D^2$ represents an amplitude variance of the motion vectors of the neighboring blocks; $D_{MVk}$ represents an amplitude of a motion vector corresponding to the kth neighboring block; $\overline{D_{MV}}$ is a mean value of the amplitudes for the motion vectors of the neighboring blocks; $\sigma_\theta^2$ represents a direction variance of the motion vectors of the neighboring blocks; $\theta_{MVk}$ represents a directional value of a motion vector corresponding to the kth neighboring block; $\overline{\theta_{MV}}$ is a mean value of the directional values for the motion vectors of the neighboring blocks; and a $\sigma_T^2$ represents the motion variance of the motion vectors.

On the other hand, in another preferred embodiment of the present invention, the motion variance between the mean value from the mean value calculation sector 211 and the motion vectors of the neighboring blocks is calculated as follows:

$$\sigma_x^2 = \frac{1}{8}\sum_{k=1}^{8} (x_k - \overline{x})^2 \qquad \text{EQ. 4}$$

$$\sigma_y^2 = \frac{1}{8}\sum_{k=1}^{8} (y_k - \overline{y})^2 \qquad \text{EQ. 5}$$

$$\sigma_T^2 = \sigma_x^2 + \sigma_y^2 \qquad \text{EQ. 6}$$

wherein $\sigma_x^2$ represents an x coordinate variance of the motion vectors of the neighboring blocks; $X_k$ represents an x coordinate value of a motion vector corresponding to the kth neighboring block; $\overline{x}$ is a mean value of the x coordinate values for the motion vectors of the neighboring blocks; $\sigma_y^2$ represents a y coordinate variance of the motion vectors of the neighboring blocks; $y_k$ represents a y coordinate value of a motion vector corresponding to the kth neighboring block; $\overline{y}$ is a mean value of the y coordinate values for the motion vectors of the neighboring blocks; and $\sigma_T^2$ represents the motion variance of the motion vectors.

The motion variance of the motion vectors determined by either the former embodiment or the latter embodiment of the present invention is fed to the comparison sector 213.

The comparison sector 213 compares the motion variance coupled thereto with a first and a second predetermined threshold values to thereby provide comparison signals to a selection unit 270 through a line L220. In the above comparison process, if the motion variance is smaller than the first predetermined threshold value, a first comparison signal C1 is generated; a second comparison signal C2 is produced if the motion variance is larger than the second predetermined threshold value; and a third comparison signal C3 is provided if the motion variance is larger than or equal to the first predetermined value and smaller than or equal to the second predetermined value.

Referring back to FIG. 2, the first compensation unit 220 produces a first substitution block based on the reconstructed preceding frame on the line L60 from the frame memory 300, and the position data representing the position of the lost block on the line L10 or the mean value of the motion vectors of the neighboring blocks transferred from the mean value calculation sector 211 in the first comparison unit 210.

That is to say, if the position data is selected for the block generation process at the first compensation unit 220 in accordance with the preferred embodiment of the present invention, the first compensation unit 220 extracts a block at the same position corresponding to the position data within the reconstructed preceding frame and provides it as the first substitution block for the lost block.

On the other hand, if the mean value of the motion vectors is chosen in accordance with another preferred embodiment of the present invention, a block at the position corresponding to the mean value of the motion vectors is selected out of blocks in the reconstructed preceding frame as the substitution block for the lost block.

The block determined at the first compensation unit 220 is fed to a compensation value calculation unit 240 and an adder 290.

Figure 5:
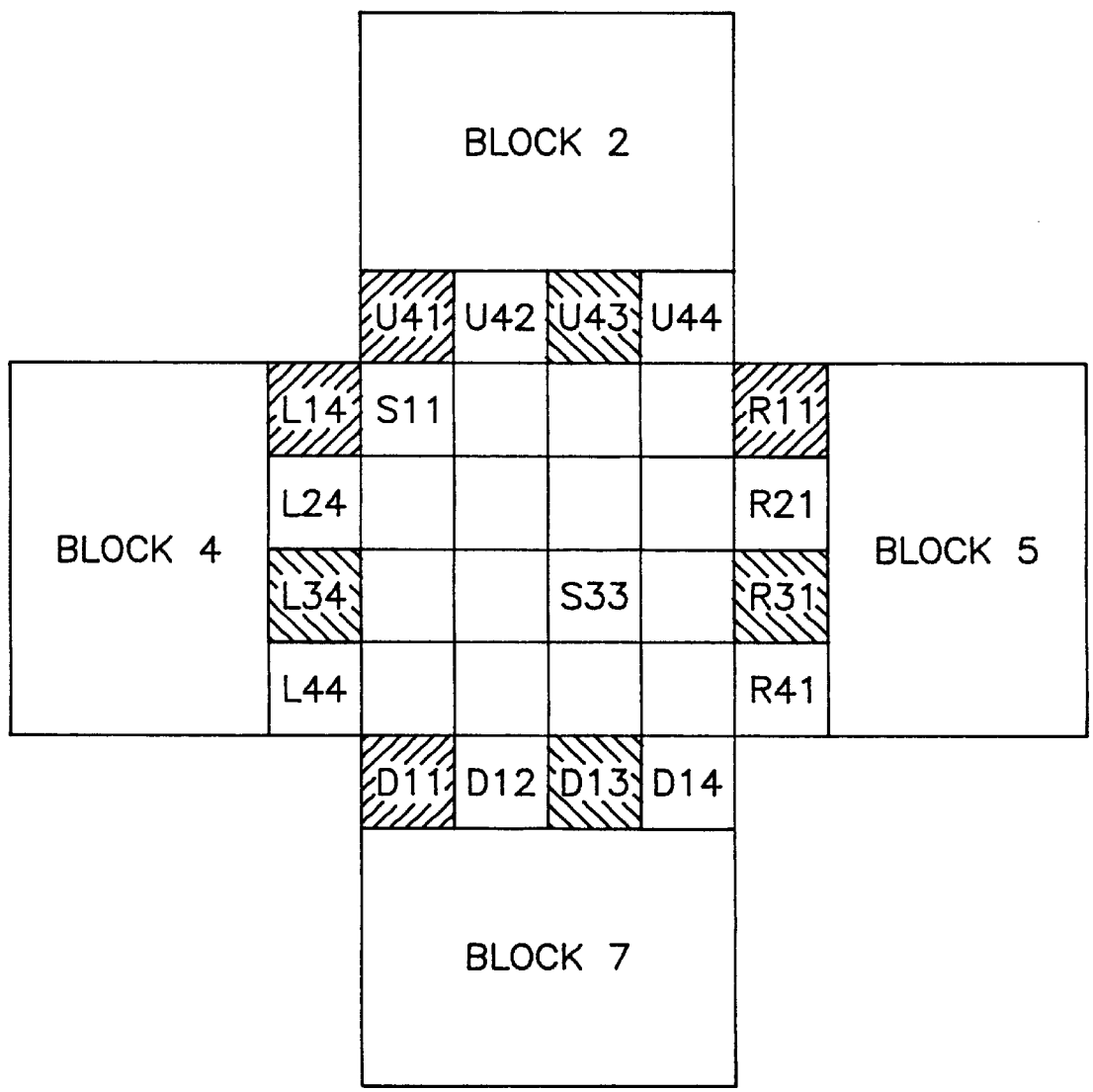
FIG. 5 illustrates an exemplary process of compensating the lost block based on pixel values of its neighboring blocks.

Meanwhile, a second compensation unit 230 generates a second substitution block through a spatial interpolation method using the pixel values of the neighboring blocks of the lost block. For example, as shown in FIG. 5, among the neighboring pixels lying adjacent to the lost block and included in the neighboring blocks 2, 4, 5 and 7, the values of the neighboring pixels which are located on the same row or column as that of each pixel of the lost block are used for the calculation of each pixel value of the substitution block. Each pixel value of the second substitution block is determined by calculating a weighted sum of the values of four pixels located on the vertical and horizontal lines as follows:

$$S_{ij} = W_1 \times U_{4j} + W_2 \times L_{i4} + W_3 \times R_{i1} + W_4 \times D_{1j} \qquad \text{EQ. 7}$$

$$W_h = \frac{\frac{1}{d_h}}{\sum_{h=1}^{4} \frac{1}{d_h}}$$

wherein $W_h$ represents a weight factor; $d_h$ represents a distance between a pixel in the lost block and each of the pixels located on the vertical and horizontal lines corresponding to the pixel in the lost block; $U_{4j}$, $L_{i4}$, $R_{i1}$ and $D_{ij}$ represent 4jth, i4th, i1st and 1jth pixel values in the upper, left, right and lower neighboring blocks, respectively; $S_{ij}$ represents an ijth pixel value in the second substitution block; and i, j and h range from 1 to 4, respectively.

Therefore, a pixel value S11 is decided by applying the four pixel values U41, D1i, L14 and R11 to the equation EQ. 7 and a pixel value S33 is determined based on the pixel values U43, D13, L34 and R31. The rest pixel values of the second substitution block are also ciphered in the same manner as the examples. The second substitution block constructed through the above process is provided to the compensation value calculation unit 240 and a multiplexer 280.

The compensation value calculation unit 240 first calculates a first and a second mean values of all pixel values of the first and the second substitution blocks, respectively; and provides a difference between the two mean values to the adder 290 as a compensation value, the difference being computed by subtracting the first mean value from the second mean value.

At the adder 290, the compensation value is added to each of the pixel values of the first substitution block from the first compensation unit 220. The first substitution block compensated by this addition process is coupled to a side-matching unit 250 and the multiplexer 280 as a compensated first substitution block.

Figure 6:
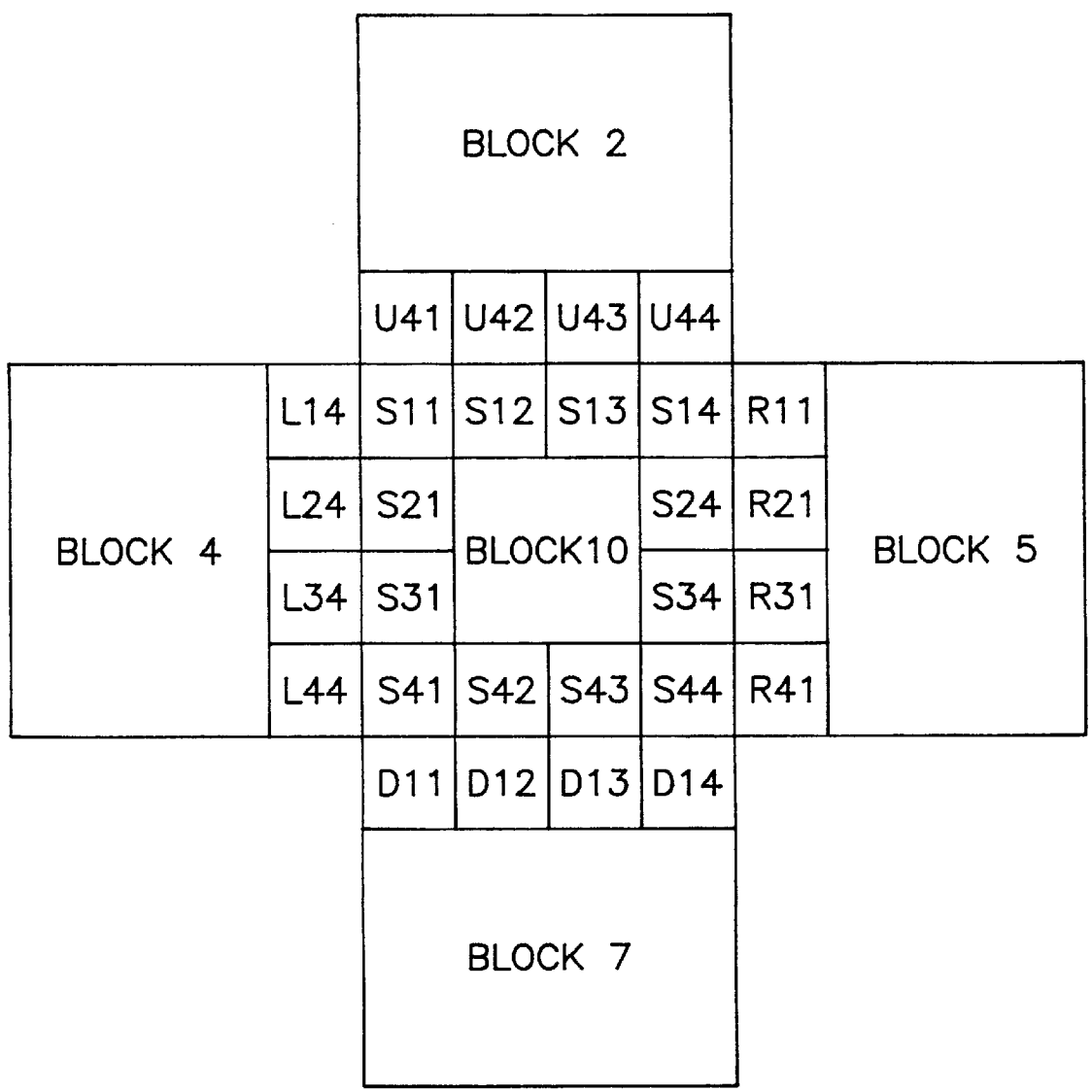
FIG. 6 describes a side-matching process between a block substituting the lost block and its neighboring blocks.

The side-matching unit 250 first puts together the compensated first substitution block, e.g., a block 10, and the neighboring blocks, i.e., blocks 1 to 8 transferred from the block detector 100 as shown in FIG. 6 and computes a side-matching function value by summing up absolute values of differences between each two pairing adjacent pixel values, one pixel being one of the boundary pixel in the block 10 and the other pairing adjacent pixel belonging to a neighboring block of the block 10. Referring to FIG. 6, the side-matching function value $f_{SM}$ is calculated as follows:

$$f_{SM} = \sum_{j=1}^{4}|S_{1j} - U_{4j}| + \sum_{i=1}^{4}|S_{i1} - L_{i4}| + \sum_{i=1}^{4}|S_{i4} - R_{i1}| + \sum_{j=1}^{4}|S_{4j} - D_{1j}| \qquad \text{EQ. 8}$$

wherein $S_{ij}$ denotes an ijth pixel value of the block 10 and $U_{ij}$, $L_{ij}$, $R_{ij}$ and $D_{ij}$ represent values of the pixels adjacent to $S_{ij}$ within the upper, left, right and lower neighboring blocks surrounding the block 10.

The side-matching function value $f_{SM}$ determined by the equation EQ. 8 is compared with a third predetermined threshold value TH3 at a second comparison unit 260. In result, if the side-matching function value $f_{SM}$ is smaller than the third predetermined threshold value TH3, a fourth comparison signal C4 is provided to the selection unit 270; and, if otherwise, a fifth comparison signal C5 is supplied to the unit 270.

The selection unit 270 generates a first and a second multiplexer control signals $C_{M1}$ and $C_{M2}$ in response to the comparison signals fed from the first and the second comparison blocks 210 and 260. The multiplexer control signal to be outputted is determined as shown in Table 1 in accordance with the preferred embodiment of the present invention.

TABLE 1

Selection of Multiplexer Control Signal

| Comparison Signals | | | | | Control Signal |
| --- | --- | --- | --- | --- | --- |
| C1 | C2 | C3 | C4 | C5 | $C_M$ |
| 1 | 0 | 0 | 1 | 0 | $C_{M1}$ |
| 0 | 1 | 0 | 1 | 0 | $C_{M2}$ |
| 0 | 0 | 1 | 1 | 0 | $C_{M1}$ |
| 1 | 0 | 0 | 0 | 1 | $C_{M1}$ |
| 0 | 1 | 0 | 0 | 1 | $C_{M2}$ |
| 0 | 0 | 1 | 0 | 1 | $C_{M2}$ |

The multiplexer control signals are alternatively fed to the multiplexer 280 as shown in Table 1.

The multiplexer 280 selects, in response to the multiplexer control signal from the selection unit 270, either the compensated first substitution block from the adder 290 or the second substitution block from the second compensation unit 230 and provides the selected substitution block to the frame memory 300 through a line L50 for the error concealment of the reconstructed current frame having the lost block. That is, if the first multiplexer control signal $C_{M1}$ is fed to the multiplexer 280, the compensated first substitution block from the adder 290 is coupled onto the line L50 for the compensation of the reconstructed current frame at the frame memory 300 in FIG. 1. On the other hand, if the second multiplexer control signal $C_{M2}$ is supplied, the second substitution block from the second compensation unit 230 is provided onto the line L50.

The selected block on the line L50 is substituted for the lost block in the reconstructed current frame at the frame memory 300 based on the position data on the line L10 from the block detector 100.

While the present invention has been shown and described in connection with the preferred embodiments only, it will be readily apparent to those of ordinary skill in the art that many changes and modifications may be made without departing from the spirit and scope of the invention as defined in the appended claims.

What is claimed is:

1. The A method, for use in a video signal decoding system, for concealing errors in a video signal transmitted in a compressed form, wherein the video signal includes a reconstructed current frame restored based on motion vectors for a current frame and a reconstructed preceding frame, each of the frames being divided into a multiplicity of blocks each of which has N×M pixel values with N and M being positive integers, the method comprising the steps of:

(a) detecting a lost block containing errors;

(b) providing pixel values of neighboring blocks of the lost block in the reconstructed current frame and motion vectors corresponding thereto;

(c) generating a compensation block based on the motion vectors for the neighboring blocks; and (d) providing the compensation block as a substitution block for concealing the lost block;

wherein the step (c) includes the steps of:

(c1) calculating a mean vector by using the motion vectors for the neighboring blocks and determining a motion variance between the mean vector and each of the motion vectors for the neighboring blocks;

(c2) comparing the motion variance with a first and a second predetermined threshold value; and (c3) if the motion variance is smaller than the first predetermined threshold value, producing the compensation block by using a block at a position corresponding to the mean vector of the motion vectors for the neighboring blocks within the reconstructed preceding frame; and wherein the motion variance is determined as:

$$\sigma_D^2 = \frac{1}{P}\sum_{k=1}^{P}(D_{MVk} - \overline{D_{MV}})^2$$

$$\sigma_\theta^2 = \frac{1}{P}\sum_{k=1}^{P}(\theta_{MVk} - \overline{\theta_{MV}})^2$$

$$\sigma_T^2 = \sigma_D^2 + \sigma_\theta^2$$

wherein $\sigma_D^2$ represents an amplitude variance of the motion vectors for the neighboring blocks; $D_{MVk}$ represents an amplitude of a motion vector corresponding to the kth neighboring block; $D_{MV}$ is a mean value of the amplitudes for the motion vectors for the neighboring blocks; $\sigma_\theta^2$ represents a direction variance of the motion vectors for the neighboring blocks; $\theta_{MVk}$ represents a directional value of a motion vector corresponding to the kth neighboring block; $\theta_{MV}$ is a mean value of the directional values of the motion vectors for the neighboring blocks; $\sigma_T^2$ represents the motion variance of the motion vectors for the neighboring blocks; and P is a positive integer representing the number of the neighboring blocks.

2. A method, for use in a video signal decoding system, for concealing errors in a video signal transmitted in a compressed form, wherein the video signal includes a reconstructed current frame restored based on motion vectors for a current frame and a reconstructed preceding frame, each of the frames being divided into a multiplicity of blocks each of which has N×M pixel values with N and M being positive integers, the method comprising the steps of:

(a) detecting a lost block containing errors;

(b) providing pixel values of neighboring blocks of the lost block in the reconstructed current frame and motion vectors corresponding thereto;

(c) generating a compensation block based on the motion vectors for the neighboring blocks; and (d) providing the compensation block as a substitution block for concealing the lost block;

wherein the step (c) includes the steps of:

(c1) calculating a mean vector by using the motion vectors for the neighboring blocks and determining a motion variance between the mean vector and each of the motion vectors for the neighboring blocks;

(c2) comparing the motion variance with a first and a second predetermined threshold value; and (c3) if the motion variance is smaller than the first predetermined threshold value, producing the compensation block by using a block at a position corresponding to the mean vector of the motion vectors for the neighboring blocks within the reconstructed preceding frame; and wherein the motion variance is determined as:

$$\sigma_x^2 = \frac{1}{P}\sum_{k=1}^{P}(x_k - \overline{x})^2$$

$$\sigma_y^2 = \frac{1}{P}\sum_{k=1}^{P}(y_k - \overline{y})^2$$

$$\sigma_T^2 = \sigma_x^2 + \sigma_y^2$$

wherein $\sigma_x^2$ represents an x coordinate variance of the motion vectors for the neighboring blocks; $x_k$ represents an x coordinate value of a motion vector corresponding to the kth neighboring block; x is a mean value of the x coordinate values of the motion vectors for the neighboring blocks; $\sigma_y^2$ represents a y coordinate variance of the motion vectors for the neighboring blocks; $y_k$ represents a y coordinate value of a motion vector corresponding to the kth neighboring block; y is a mean value of the y coordinate values of the motion vectors for the neighboring blocks; $\sigma_T^2$ represents the motion variance of the motion vectors for the neighboring blocks; and P is a positive integer representing the number of the neighboring blocks.

3. The method according to claim 1, wherein the step (c3) further includes, if the motion variance is larger than the second predetermined threshold value, the step of:

(c311) detecting, among the neighboring pixels in the upper, left, right and lower neighboring blocks and lying adjacent to the lost block, four neighboring pixels which are located on the same row or column as that of each pixel of the lost block; and (c312) generating the compensation block based on a weighted sum of the four neighboring pixel values computed as:

$$S_{ij} = W_1 \times U_{Nj} + W_2 \times L_{iM} + W_3 \times R_{iI} + W_4 \times D_{1j}$$

$$W_h = \frac{\frac{1}{d_h}}{\sum_{h=1}^{4}\frac{1}{d_h}}$$

wherein $W_h$ represents a weight factor; $d_h$ represents a distance between a pixel in the lost block and each of the pixels on the vertical and horizontal lines corresponding to the pixel in the lost block; $S_{ij}$ represents an ijth pixel value in the compensation block; $U_{Nj}$, $L_{iM}$, $R_{i1}$ and $D_{1j}$ represent Njth, imth, ilst and ljth pixel values in the upper, left, right and lower neighboring blocks, respectively; h is from 1 to 4; i ranges from 1 to N; and j ranges from 1 to M.

4. The method according to claim 1, wherein the step (c3) further includes, if the motion variance is larger than or equal to the first predetermined threshold value and smaller than or equal to the second predetermined threshold value, the steps of:

(c321) producing a block by using a block at a position corresponding to the mean vector of the motion vectors for the neighboring blocks within the reconstructed preceding frame;

(c322) side-matching the neighboring blocks of the lost block with the block generated in the step (c321) to thereby provide a side-matching function value;

(c323) comparing the side-matching function value with a third predetermined threshold value; and (c324) if the side-matching function value is smaller than the third predetermined threshold value, providing the block generated in the step (c321) as the compensation block. (c325) if the side-matching function value is larger than or equal to the third predetermined threshold value, producing the compensation block based on the pixel values of the neighboring blocks, and said step (c325) includes the steps of:

(p1) detecting, among the neighboring pixels in the upper, left, right and lower neighboring blocks and lying adjacent to the lost block, four neighboring pixels which are located on the same row or column as that of each pixel of the lost block; and (p2) generating the compensation block based on a weighted sum of the four neighboring pixel values computed as:

$$S_{ij} = W_1 \times U_{Nj} + W_2 \times L_{iM} + W_3 \times R_{i1} + W_4 \times D_{1j}$$

$$W_h = \frac{\frac{1}{d_h}}{\sum_{h=1}^{4} \frac{1}{d_h}}$$

wherein $W_h$ represents a weight factor; $d_h$ represents a distance between a pixel in the lost block and each of the pixels on the vertical and horizontal lines corresponding to the pixel in the lost block; $S_{ij}$ represents an ijth pixel value in the compensation block; $U_{Nj}$, $L_{iN}$, $R_{i1}$ and $D_{ij}$ represent Njth, iMth, ilst and ljth pixel values in the upper, left, right and lower neighboring blocks, respectively; h is from 1 to 4; i ranges from 1 to N; and j ranges from 1 to M.

5. The method according to claim 4, wherein the side-matching function value is determined as:

$$f_{SM} = \sum_{j=1}^{M} |S_{1j} - U_{Nj}| + \sum_{i=1}^{N} |S_{i1} - L_{iM}| + \sum_{i=1}^{N} |S_{iM} - R_{i1}| + \sum_{j=1}^{M} |S_{Nj} - D_{1j}|$$

wherein $S_{ij}$ denotes an ijth pixel value of the block generated in the step (c321); $U_{Nj}$, $L_{iM}$, $R_{i1}$ and $D_{1j}$ represent Njth, iMth, ilst and ljth pixel values in the upper, left, right and lower neighboring blocks, respectively; and $f_{SM}$ is the side-matching function value.

6. An apparatus, for use in a video signal decoding system, for concealing errors in a video signal transmitted in a compressed form, wherein the video signal includes a reconstructed current frame restored based on motion vectors for a current frame and a reconstructed preceding frame, each of the frames being divided into a multiplicity of blocks each of which has N×M pixel values with N and M being positive integers, which comprises:

means for detecting a lost block containing errors to thereby produce position data representing the position of the lost block in the video signal;

means for providing pixel values of neighboring blocks of the lost block in the reconstructed current frame and motion vectors corresponding thereto based on the position data;

means for calculating a mean vector by using the motion vectors for the neighboring blocks;

means for producing a motion-based block based on the mean vector, the position data and pixel values of the reconstructed preceding frame;

a block generation means for producing a spatially interpolated block based on the pixel values of the neighboring blocks; and a selection means for choosing either the motion-based block or the spatially interpolated block as a substitution block for correcting the lost block using the mean vector, wherein the block generation means contains:

means for detecting, among the neighboring pixels in the upper, left, right and lower neighboring blocks and lying adjacent to the lost block, four neighboring pixels which are located on the same row or column as that of each pixel of the lost block;

means for computing each pixel value in the spatially interpolated block by calculating a weighted sum of the four neighboring pixel values as:

$$S_{ij} = W_1 \times U_{Nj} + W_2 \times L_{iM} + W_3 \times R_{i1} + W_4 \times D_{1j}$$

$$W_h = \frac{\frac{1}{d_h}}{\sum_{h=1}^{4} \frac{1}{d_h}}$$

wherein $W_h$ represents a weight factor; $d_h$ represents a distance between a pixel in the lost block and each of the pixels on the vertical and horizontal lines corresponding to the pixel in the lost block; $S_{ij}$ represents an ijth pixel value in the spatially interpolated block; $U_{Nj}$, $L_{iM}$, $R_{i1}$ and $D_{1j}$ represent Njth, iMth, ilst and ljth pixel values in the upper, left, right and lower neighboring blocks, respectively; h is from 1 to 4; i ranges from 1 to N; and j ranges from 1 to M.

7. The apparatus as recited in claim 6, wherein a block at a same position corresponding to the position data within the reconstructed preceding frame is selected as the motion-based block.

8. The apparatus as recited in claim 6, wherein a block at a position corresponding to the vector within the reconstructed preceding frame is chosen as the motion-based block.

9. The apparatus as recited in claim 6, wherein the selection means includes:

means for determining a motion variance between the mean vector and each of the motion vectors for the neighboring blocks;

a comparison means for comparing the motion variance with a first and a second predetermined threshold values to thereby produce path selection signals; and a contribution means for providing, in response to the path selection signals, either the motion-based block or the spatially interpolated block as the substitution block.

10. The apparatus as recited in claim 9, wherein the motion variance is determined as:

$$\sigma_D^2 = \frac{1}{P}\sum_{k=1}^{P}(D_{MVk} - \overline{D_{MV}})^2$$

$$\sigma_\theta^2 = \frac{1}{P}\sum_{k=1}^{P}(\theta_{MVk} - \overline{\theta_{MV}})^2$$

$$\sigma_T^2 = \sigma_D^2 + \sigma_\theta^2$$

wherein $\sigma_D^2$ represents an amplitude variance of the motion vectors for the neighboring blocks; $D_{MVk}$ represents an amplitude of a motion vector corresponding to the kth neighboring block; $\overline{D_{MV}}$ is a mean value of the amplitudes of the motion vectors for the neighboring blocks; $\sigma_\theta^2$ represents a direction variance of the motion vectors for the neighboring blocks; $\theta_{MVk}$ represents a directional value of a motion vector corresponding to the kth neighboring block; $\overline{\theta_{MV}}$ is a mean value of the directional values of the motion vectors for the neighboring blocks; $\sigma_T^2$ represents the motion variance of the motion vectors for the neighboring blocks; and P is a positive integer representing the number of the neighboring blocks.

11. The apparatus as recited in claim 9, wherein the motion variance is determined as:

$$\sigma_x^2 = \frac{1}{P}\sum_{k=1}^{P}(x_k - \bar{x})^2$$

$$\sigma_y^2 = \frac{1}{P}\sum_{k=1}^{P}(y_k - \bar{y})^2$$

$$\sigma_T^2 = \sigma_x^2 + \sigma_y^2$$

wherein $\sigma_x^2$ represents an x coordinate variance of the motion vectors for the neighboring blocks; $x_k$ represents an x coordinate value of a motion vector corresponding to the kth neighboring block; $\bar{x}$ is a mean value of the x coordinate values of the motion vectors for the neighboring blocks; $\sigma_y^2$ represents a y coordinate variance of the motion vectors for the neighboring blocks; $y_k$ represents a y coordinate value of a motion vector corresponding to the kth neighboring block; $\bar{y}$ is a mean value of the y coordinate values of the motion vectors for the neighboring blocks; $\sigma_T^2$ represents the motion variance of the motion vectors for the neighboring blocks; and P is a positive integer representing the number of the neighboring blocks.

12. The apparatus as recited in claim 9, wherein the comparison means contains:

means for producing a first path selection signal if the motion variance is smaller than the first predetermined threshold value; and means for generating a second path selection signal if the motion variance is larger than the second predetermined threshold value.

13. The apparatus as recited in claim 12, wherein the contribution means contains:

means for providing, in response to the first path selection signal, the motion-based block as the substitution block; and means for supplying, in response to the second path selection signal, the spatially interpolated block as the substitution block.

14. The apparatus as recited in claim 13, wherein the selection means contains:

means for generating a third path selection signal if the motion variance is larger than or equal to the first predetermined threshold value and smaller than or equal to the second predetermined threshold value;

means for side-matching the neighboring blocks of the lost block with the motion-based block to thereby generate a side-matching function value;

means for producing a first comparison signal if the side-matching function value is smaller than the third predetermined threshold value;

means for generating a second comparison signal if the side-matching function value is larger than or equal to the third predetermined threshold value;

means for providing, in response to the third path selection signal and the first comparison signal, the motion-based block as the substitution block; and means for supplying, in response to the third path selection signal and the second comparison signal, the spatially interpolated block as the substitution block.

15. The apparatus as recited in claim 14, wherein the side-matching function value is determined as:

$$f_{SM} = \sum_{j=1}^{M}|S_{1j} - U_{Nj}| + \sum_{i=1}^{N}|S_{i1} - L_{iM}| + \sum_{i=1}^{N}|S_{iM} - R_{i1}| + \sum_{j=1}^{M}|S_{Nj} - D_{1j}|$$

wherein $S_{ij}$ denotes ijth pixel value of the motion-based block; $U_{Nj}$, $L_{iM}$, $R_{i1}$ and $D_{1j}$ represent Njth, iMth, i1st and 1jth pixel values in the upper, left, right and lower neighboring blocks, respectively; and $f_{SM}$ is the side-matching function value.

16. An apparatus, for use in a video signal decoding system, for concealing errors in a video signal transmitted in a compressed form, wherein the video signal includes a reconstructed current frame restored based on motion vectors for a current frame and a reconstructed preceding frame, each of the frames being divided into a multiplicity of blocks each of which has N×M pixel values with N and M being positive integers, which comprises:

means for detecting a lost block containing errors to thereby produce position data representing the position of the lost block in the video signal;

means for providing pixel values of neighboring blocks of the lost block in the reconstructed current frame and motion vectors corresponding thereto based on the position data;

means for calculating a mean vector by using the motion vectors for the neighboring blocks;

means for producing a motion-based block substituting the lost block based on the mean vector, the position data and pixel values of the reconstructed preceding frame;

a block generation means for producing a spatially interpolated block based on the pixel values of the neighboring blocks;

means for calculating a first mean value of all pixel values of the motion-based block;

means for ciphering a second mean value of all pixel values of the spatially interpolated block;

means for computing a difference between the first and the second mean values by subtracting the first mean value from the second mean value;

means for adding the difference to each of the pixel values of the motion-based block to thereby provide an error compensated block; and a selection means for choosing either the error compensated block or the spatially interpolated block as a substitution block for correcting the lost block based on the mean vector.

17. The apparatus as recited in claim 16, wherein the block generation means includes:

means for detecting, among the neighboring pixels in the upper, left, right and lower neighboring blocks and lying adjacent to the lost block, four neighboring pixels which are located on the same row or column as that of each pixel of the lost block;

means for computing each pixel value in the spatially interpolated block by calculating a weighted sum of the four neighboring pixel values as:

$$S_{ij} = W_1 \times U_{Nj} + W_2 \times L_{iM} + W_3 \times R_{i1} + W_4 \times D_{1j}$$

$$W_h = \frac{\frac{1}{d_h}}{\sum_{h=1}^{4} \frac{1}{d_h}}$$

wherein $W_h$ represents a weight factor; $d_h$ represents a distance between a pixel in the lost block and each of the pixels on the vertical and horizontal lines corresponding to the pixel in the lost block; $S_{ij}$ represents an ijth pixel value in the spatially interpolated block; $U_{Nj}$, $L_{iM}$, $R_{i1}$ and $D_{ij}$ represent Njth, iMth, ilst and ljth pixel values in the upper, left, right and lower neighboring blocks, respectively; h is from 1 to 4; i ranges from 1 to N; and j ranges from 1 to M.

18. The apparatus as recited in claim 17, wherein the selection means includes:

means for determining a motion variance between the mean vector and each of the motion vectors for the neighboring blocks;

a comparison means for comparing the motion variance with a first and a second predetermined threshold values to thereby produce path selection signals; and a contribution means for providing, in response to the path selection signals, either the error compensated block or the spatially interpolated block as the substitution block.

19. The apparatus as recited in claim 18, wherein the motion variance is determined as:

$$\sigma_D^2 = \frac{1}{P}\sum_{k=1}^{P}(D_{MVk} - \overline{D_{MV}})^2$$

$$\sigma_\theta^2 = \frac{1}{P}\sum_{k=1}^{P}(\theta_{MVk} - \overline{\theta_{MV}})^2$$

$$\sigma_T^2 = \sigma_D^2 + \sigma_\theta^2$$

wherein $\sigma_D^2$ represents an amplitude variance of the motion vectors for the neighboring blocks; $D_{MVk}$ represents an amplitude of a motion vector corresponding to the kth neighboring block; $\overline{D_{MV}}$ is a mean value of the amplitudes of the motion vectors for the neighboring blocks; $\sigma_\theta^2$ represents a direction variance of the motion vectors for the neighboring blocks; $\theta_{MVk}$ represents a directional value of a motion vector corresponding to the kth neighboring block; $\overline{\theta_{MV}}$ is a mean value of the directional values of the motion vectors for the neighboring blocks; $\sigma_T^2$ represents the motion variance of the motion vectors for the neighboring blocks; and P is a positive integer representing the number of the neighboring blocks.

20. The apparatus as recited in claim 18, wherein the motion variance is determined as:

$$\sigma_x^2 = \frac{1}{P}\sum_{k=1}^{P}(x_k - \overline{x})^2$$

$$\sigma_y^2 = \frac{1}{P}\sum_{k=1}^{P}(y_k - \overline{y})^2$$

$$\sigma_T^2 = \sigma_x^2 + \sigma_y^2$$

wherein $\sigma_x^2$ represents an x coordinate variance of the motion vectors for the neighboring blocks; $X_k$ represents an x coordinate value of a motion vector corresponding to the kth neighboring block; $\overline{x}$ is a mean value of the x coordinate values of the motion vectors for the neighboring blocks; $\sigma_y^2$ represents a y coordinate variance of the motion vectors for the neighboring blocks; $y_k$ represents a y coordinate value of a motion vector corresponding to the kth neighboring block; $\overline{y}$ is a mean value of the y coordinate values of the motion vectors for the neighboring blocks; $\sigma_T^2$ represents the motion variance of the motion vectors for the neighboring blocks; and P is a positive integer representing the number of the neighboring blocks.

21. The apparatus as recited in claim 18, wherein the comparison means contains:

means for producing a first path selection signal if the motion variance is smaller than the first predetermined threshold value; and means for generating a second path selection signal if the motion variance is larger than the second predetermined threshold value.

22. The apparatus as recited in claim 21, wherein the contribution means contains:

means for providing, in response to the first path selection signal, the error compensated block as the substitution block; and means for supplying, in response to the second path selection signal, the spatially interpolated block as the substitution block.

23. The apparatus as recited in claim 22, wherein the selection means contains:

means for generating a third path selection signal if the motion variance is larger than or equal to the first predetermined threshold value and smaller than or equal to the second predetermined threshold value;

means for side-matching the neighboring blocks of the lost block with the error compensated block to thereby generate a side-matching function value;

means for producing a first comparison signal if the side-matching function value is smaller than the third predetermined threshold value;

means for generating a second comparison signal if the side-matching function value is larger than or equal to the third predetermined threshold value;

means for providing, in response to the third path selection signal and the first side-matching comparison signal, the error compensated block as the substitution block; and means for supplying, in response to the third path selection signal and the second side-matching comparison signal, the spatially interpolated block as the substitution block.

24. The apparatus as recited in claim 23, wherein the side-matching function value is determined as:

$$f_{SM} = \sum_{j=1}^{M} |S_{1j} - U_{Nj}| + \sum_{i=1}^{N} |S_{i1} - L_{iM}| + \sum_{i=1}^{N} |S_{iM} - R_{i1}| + \sum_{j=1}^{M} |S_{Nj} - D_{1j}|$$

wherein $S_{ij}$ denotes an ijth pixel value of the error compensated block; $U_{Nj}$, $L_{iM}$, $R_{i1}$ and $D_{1j}$ represent Njth, iMth, i1st and 1jth pixel values in the upper, left, right and lower neighboring blocks, respectively; and $f_{SM}$ is the side-matching function value.

* * * * *